United States Patent [19]
Whittlesey

[11] Patent Number: 5,916,019
[45] Date of Patent: Jun. 29, 1999

[54] CASING BRAKE CONSTRUCTION FOR SAUSAGE DISCHARGE HORN

[75] Inventor: Thomas Whittlesey, Apex, N.C.

[73] Assignee: Delaware Capital Formation, Inc., Wilmington, Del.

[21] Appl. No.: 09/093,247

[22] Filed: Jun. 8, 1998

[51] Int. Cl.[6] .......................... A22C 11/02; A22C 11/00
[52] U.S. Cl. ............................................. 452/35; 452/32
[58] Field of Search ................................ 452/30, 32, 33, 452/34, 35, 37

[56] References Cited

U.S. PATENT DOCUMENTS

| Re. 30,390 | 9/1980 | Kupcikevicius et al. ................. 452/35 |
| 4,142,273 | 3/1979 | Gay ............................................ 452/33 |
| 4,437,209 | 3/1984 | Duroyon .................................... 452/33 |
| 4,675,945 | 6/1987 | Evans et al. ............................... 452/33 |
| 4,847,953 | 7/1989 | Evans et al. ............................... 452/35 |
| 4,887,332 | 12/1989 | Evans et al. ............................... 452/35 |
| 4,980,949 | 1/1991 | Stanley ..................................... 452/37 |
| 4,991,260 | 2/1991 | Nausedas .................................. 452/35 |
| 5,003,666 | 4/1991 | Stall et al. ................................. 452/35 |
| 5,074,386 | 12/1991 | Evans ........................................ 452/32 |
| 5,152,712 | 10/1992 | Nausedas .................................. 452/37 |
| 5,167,567 | 12/1992 | Evans ........................................ 452/37 |
| 5,197,914 | 3/1993 | Powers ...................................... 452/32 |

FOREIGN PATENT DOCUMENTS

| 46560 | 3/1982 | European Pat. Off. ................. 452/32 |
| 79958 | 1/1963 | France ....................................... 452/35 |
| 2950590 | 6/1981 | Germany ................................... 452/35 |
| 682440 | 9/1993 | Switzerland .............................. 452/35 |

*Primary Examiner*—Michael J. Carone
*Assistant Examiner*—Fredrick T. French, III
*Attorney, Agent, or Firm*—Banner & Witcoff, Ltd.

[57] ABSTRACT

A casing brake construction in combination with a product discharge horn includes three generally parallel mounting plates with one of the plates holding the skin brake and the other two plates connected with the first plate and moveable relative to one another in an axial direction with respect to the product discharge horn to thereby position the horn in any one of three positions. The casing brake moves between a clipping and a rearward position with respect to the discharge horn and then moves over the end of the horn to remove excess product from the horn in order to enhance the aesthetics of the product.

4 Claims, 3 Drawing Sheets

(30)

(26)

(28)

CASING BRAKE CONSTRUCTION FOR SAUSAGE DISCHARGE HORN

BACKGROUND OF THE INVENTION

This invention relates to an improved casing brake construction and, more particularly, to a casing brake construction for use with a sausage link or other comminuted, link product filling apparatus wherein smearing of the product on the inside wall of the casing during the filling and packaging operation is minimized to enhance the aesthetic appearance of the product.

Product packaging apparatus of the type which utilize an extended or lengthy piece of casing rucked on a discharge horn or pipe are taught in various prior art patents, for example, U.S. Pat. No. 4,142,273 and U.S. Pat. No. 4,675,945, incorporated herewith by reference. Briefly, a viscous product is continuously fed through a pipe or horn into flexible casing in the form of a cylindrical tube that is then sealed at intervals to form links. The apparatus fills the casing in a continuous filling operation and automatically closes and seals the ends of the uniform links.

Such apparatus are quite useful for continuously producing packaged products at a high rate of product production. However, the resultant product does not always have a satisfactory appearance as contrasted with product packaged on a piece goods machine wherein single links, elements or lengths of casing are filled with product, and the ends of the casing then sealed with a metal clip, for example. More specifically, utilization of apparatus which produces a single, filled casing product virtually eliminates or avoids the smearing of the product on the inside wall of the casing during the filling operation. The appearance of the product, for example, sausage or other food, thus is significantly enhanced and aesthetically pleasing to the consumer.

In contrast, the filling operation associated with a continuously operating, filling apparatus often results in producing an unappealing, smeared pattern of the product on the inside wall of the casing. This leads to consumer dissatisfaction with product appearance. Addressing this problem is a focus of the subject matter of the present development.

SUMMARY OF THE INVENTION

Briefly, the present invention comprises an improved skin or casing brake construction which is designed to release flexible, shirred or rucked casing from a sausage filling horn in a controlled manner and stepwise to avoid build-up of unaesthetic product residue on the inside of the casing material as it is released from the product discharge horn. The braking mechanism controls the release of shirred casing during the casing filling operation by controlling the position of the brake which frictionally engages the casing against the outside diameter of the filling tube. Thus the filling tube has an expanded diameter end against which the brake engages the casing during the product filling operation. Prior to subsequent tying or clipping to close the filled casing, the brake mechanism is retracted from the end of the filling horn to a lesser diameter section of the horn or filling tube. This enables the casing to easily slide over the wide diameter, open end of the filling horn while the product voiding and clipping or sealing operation is effected. Thereafter, the brake is transported longitudinally over the large diameter end of the tube and along the center line axis of the filling tube or horn beyond the open end of the filling tube. In doing so, the braking mechanism engages the casing tightly against the larger diameter end of the tube and effectively wipes the outside surface of the end of the filling tube free of residual product causing that residual product to fill in or merge into the product associated with the next item in the cyclical operation of the filling apparatus. Thereafter, prior to filling of the casing and the wiping action described, the brake is moved rearwardly once again axially for a limited distance and is thereby again positioned over the expanded diameter forward end of the filling horn or tube. The described controlled and sequential movement of the brake during operation by the filling apparatus insures that product accumulation at the end of the horn on the outside surface thereof and on the outside surface of product discharged from the horn will be reduced thereby improving the aesthetic appearance of the product in the casing as it is filled. The mechanism for moving the brake between the three described stations or positions includes a series of mounting plates which are slidably interconnected enabling them to precisely move with respect to one another and thus to precisely move the braking mechanism mounted on one of them in distinct, integral and separate steps between stations to cumulatively provide a maximum distance of travel of the braking mechanism.

Thus, it is an object of the invention to provide an improved skin brake construction which effectively reduces or eliminates smear of sausage or other viscous product on the inside surface of casing and the outside surface of the product during a filling operation.

It is another object of the invention to provide an improved skin brake construction for use in combination with a product discharge horn or pipe wherein the brake may be positioned in any one of multiple positions relative to the longitudinal axis of the product discharge horn.

Another object of the invention is to provide an improved skin brake construction which provides for positioning of the skin brake in any one of multiple positions relative to a product discharge horn so as to facilitate the operation of the filling protocol associated with the product discharge horn.

A further object of the invention is to provide a skin brake construction which may be utilized in combination with product discharge horns of pre-existing configuration and which may be economically and efficiently incorporated in product packaging machines.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
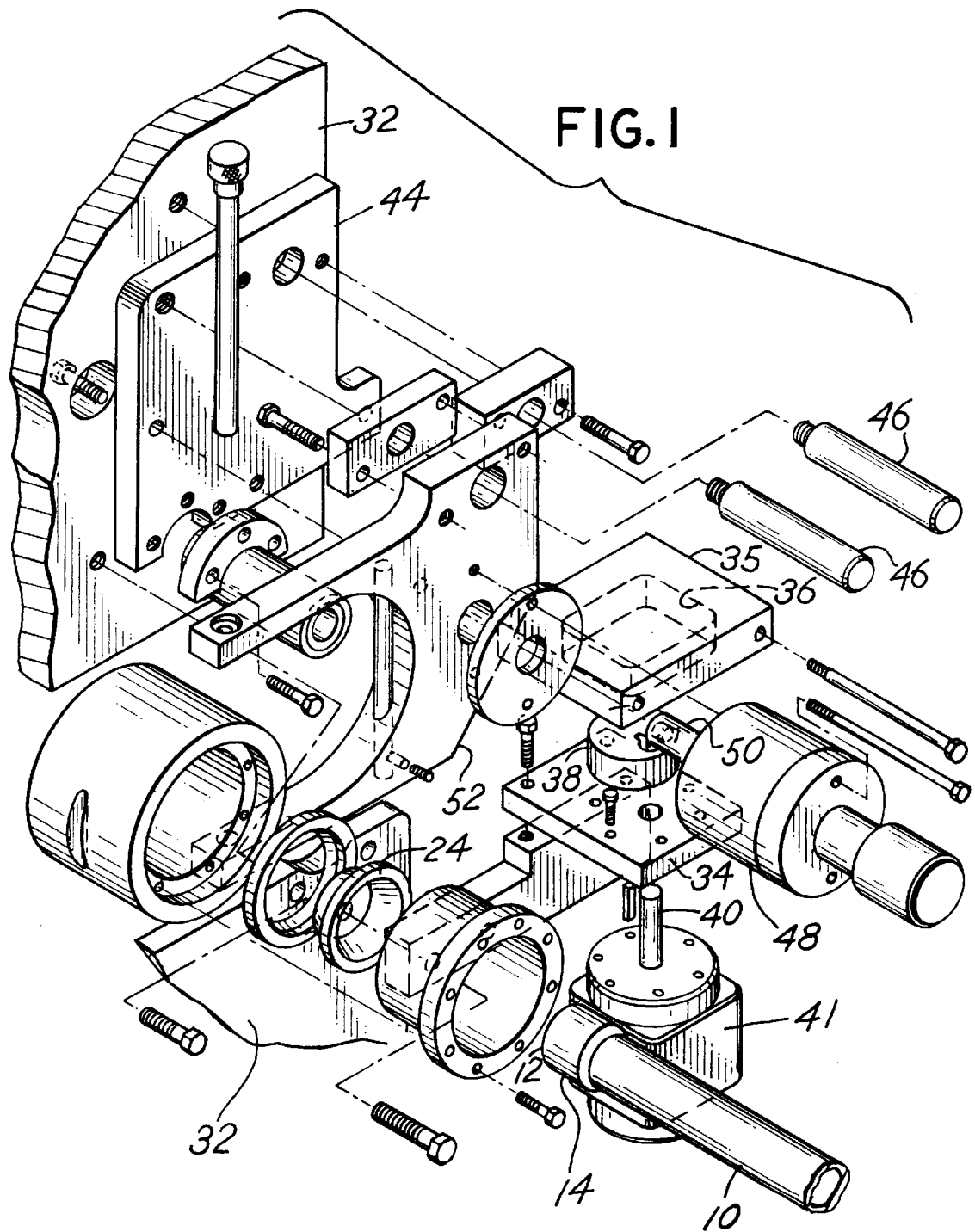
FIG. 1 is an exploded isometric view of the combination skin brake and discharge horn of the invention which is incorporated with a product packaging device.
Figure 2:
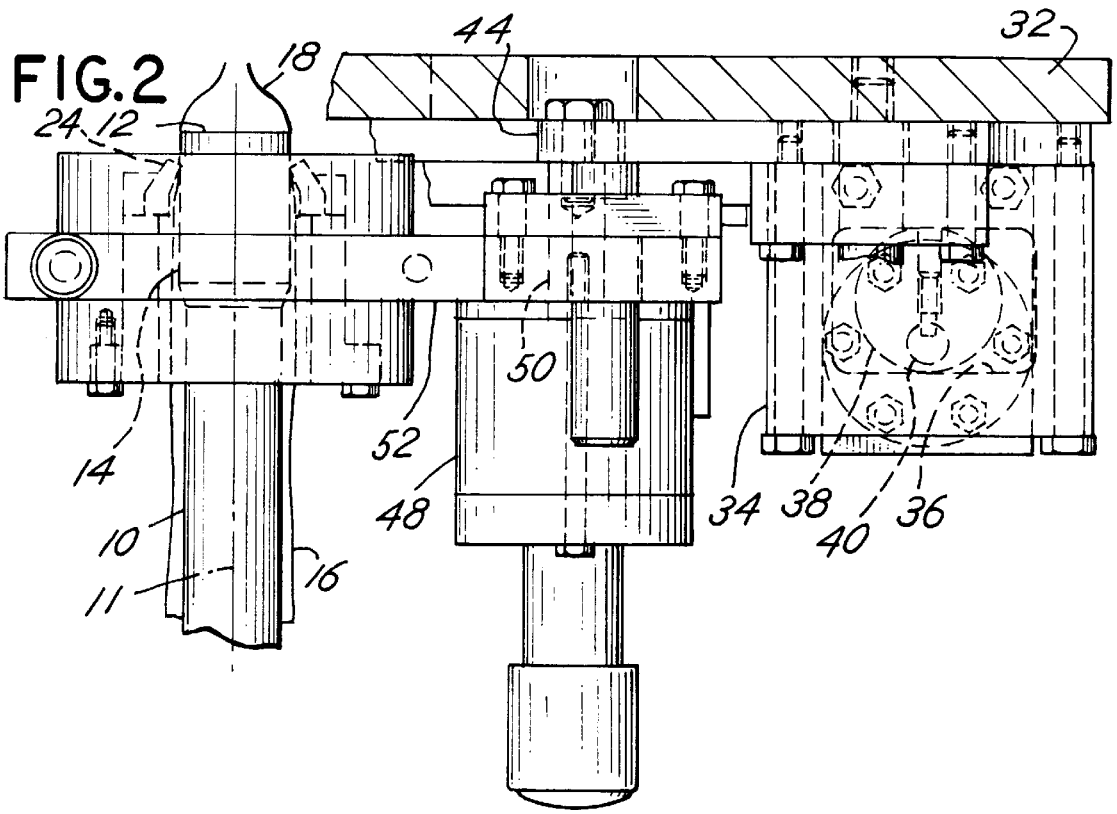
FIG. 2 is a top plan view of the construction of FIG. 1.
Figure 3:
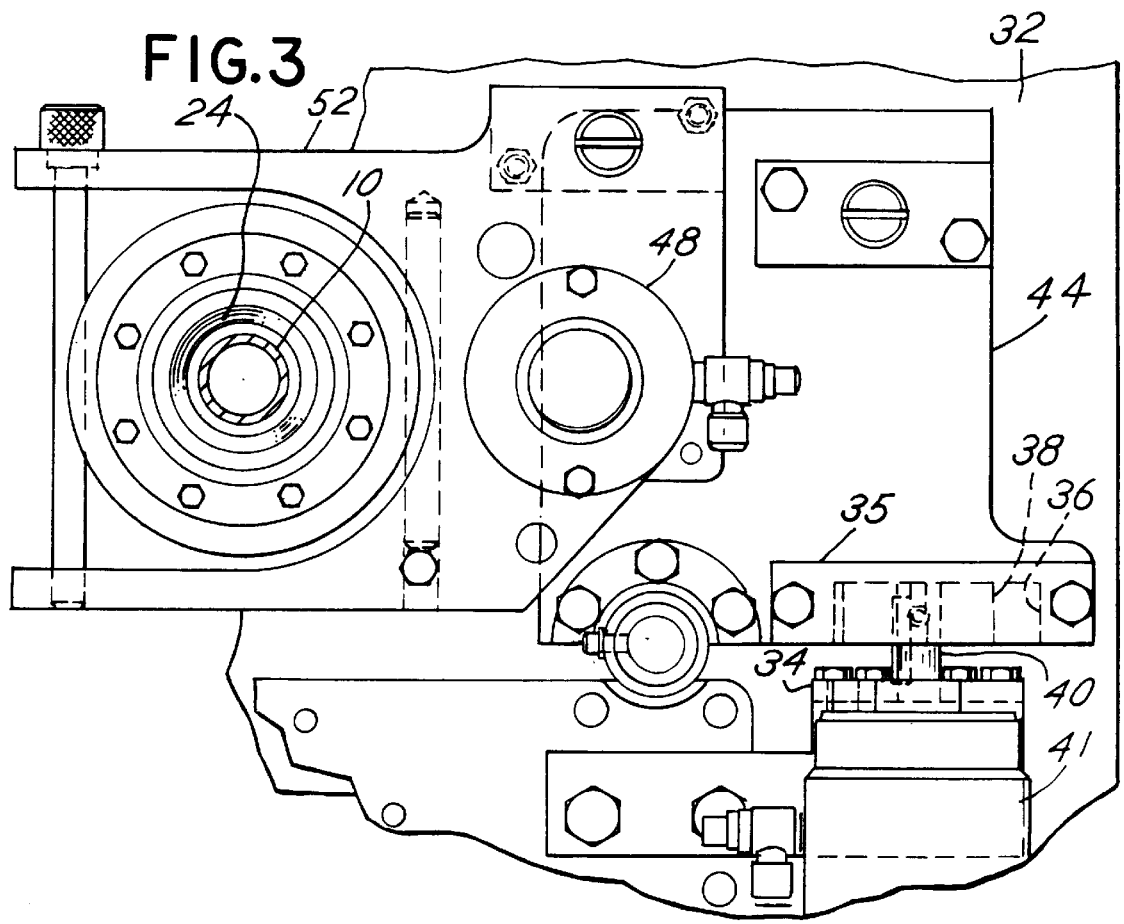
FIG. 3 is an end view of the construction of FIG. 1.

Referring to the figures, the product filling apparatus includes a discharge pipe or tube, also known as a horn 10. Comminuted product 23 is provided through the horn 10 and is discharged from an open end 12 of the horn 10 (for example, using apparatus known and as disclosed in references incorporated herein). The horn 10 is typically a stainless steel pipe or tube having a uniform diameter with an enlarged diameter discharge end section or run 14. Casing 16, which is rucked or shirred onto the horn 10, is released therefrom in a controlled manner as comminuted product 23 passes through the horn 10 into casing 16. Typically, the leading end 18 of casing 16 is sealed or clipped, for example, by means of a U-shaped metal clip 20 which is affixed about the end 18. Thus a clip 20 is attached to the leading end 18 by means of a clipper. The clip 20 seals the end 18 of the casing 16. Comminuted product 23 then passes or flows into the casing 16 as it is withdrawn or is released from the horn 10. Filling of the casing 16 is dependent upon the rate of product 23 discharge from the horn 10. Additionally, release of casing 16 from the horn 10 is controlled by means of a brake 24. The construction of the brake 24 is shown, for example, and not by way of limitation in U.S. Pat. No. 4,142,273 or U.S. Pat. No. 4,675,945. Both of these patents are incorporated herewith by reference for an explanation of a typical brake 24.

The brake 24 engages against the outside surface of casing 16 and provides a frictional force against the casing 16 impinging the casing 16 against the outside surface of horn 10 to control the rate of release of the casing 16. During the product filling operation of casing 16, the brake 24 is aligned longitudinally on the enlarged section 14 of the horn 10 to control the release of the casing 16 as it passes over the enlarged end run 14.

Figure 4A:
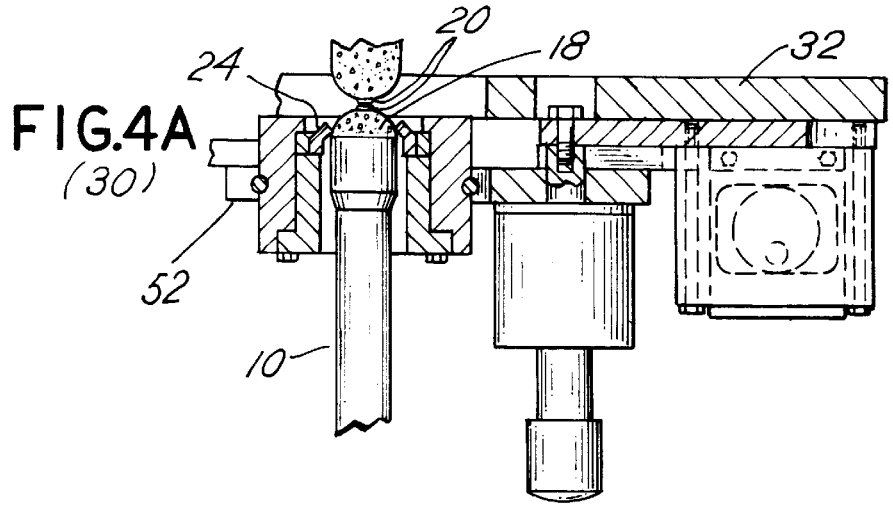
FIG. 4A, 4B, and 4C are top plan views of the construction of FIG. 1 illustrating the alternative positions of the skin brake relative to the product discharge horn and mechanisms associated for mounting of the skin brake.
Figure 4B:
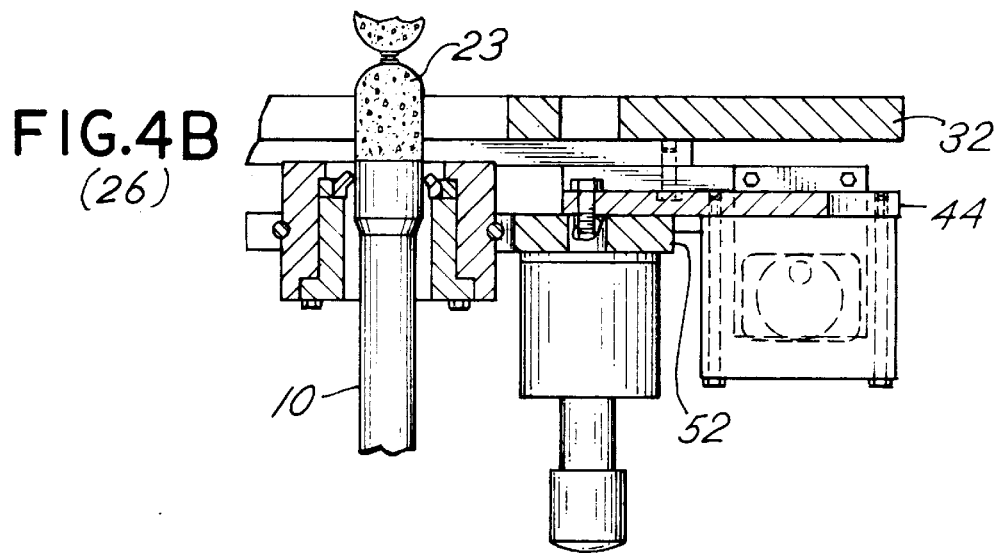
Figure 4C:
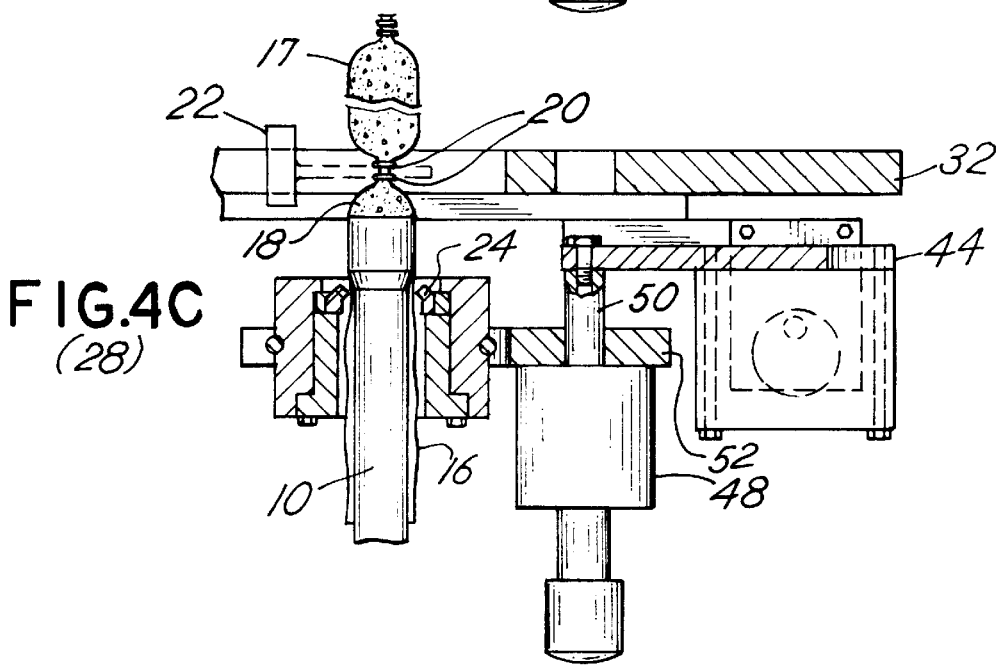

The invention relates to a mechanism for controlling the position of brake 24 relative to a longitudinal axis 11 of the brake 24. The mechanism positions the brake 24 at any one of three distinct positions or stations along axis 11, depending upon the sequence in the operation of filling of the casing 16. That is, during the filling operation, the brake 24 is positioned at a first station 26 associated with filling of the casing 16 (FIG. 4B). Upon completion of filling of the casing 16 to form one link of product, the brake 24 is moved axially rearwardly along axis 11 to a second station 28 and is positioned over the reduced diameter section of the horn 10 (FIG. 4C). That is, the diameter of the horn 10 on the outside surface is a lesser diameter at a position longitudinally rearward from the forward end 14. When the brake 24 is withdrawn to the second station 28, a clipper 22, adjacent the end 12 of horn 10, is actuated. The clipper 22 gathers the casing 16 immediately adjacent the end of the horn 10, constricts the casing 16 and places clips 20a,b around the constricted casing 16. Typically two clips 20 are placed immediately adjacent each other and around the casing 16. A first clip 20a seals off the casing 16 associated with a filled link 17. A second clip 20b seals off the open end 18 of the casing 16. Thus, the rucked or shirred casing 16 is easily withdrawn over the expanded, oversized end 14 of the horn 10 during the clipping operation since the clipping operation, which also gathers the casing 16, requires that some of the casing 16 be pulled from horn 10 easily as the casing 16 is gathered for clipping.

A third and final station 30 (FIG. 4A) is located at the very forward end 12 of the larger diameter end run 14 of the horn 10. Movement of the brake 24 to the third station 30 from the second station 28 causes the brake 24 to move longitudinally over casing 16 along run 14 thereby wiping or forcing any residual comminuted product, such as fat or meat product, which gathers or forms on the end run 14. This residual material is folded into the interior of the casing 16 and thus enhances the appearance of the casing 16 as it is filled with product 23.

The mechanism for movement of the brake 24 between the three stations 26, 28, 30 is effected by a control and mounting arrangement for the brake 24. Specifically, a mounting plate 32 is fixed relative to the horn 10. Supported on that plate 32 is a bracket 34 with a cam mechanism supported thereby. Thus, a cam 38 is mounted on a shaft 40 which is eccentric with respect to the shaft 40. Shaft 40 is driven by a motor 41 attached to bracket 34. Rotation of the cam 38 by shaft 40 causes the cam 38 to rotate and move a plate 44 longitudinally or parallel to axis 11 due to engagement of cam 38 with a follower 35 and more particularly a cam raceway 36.

The follower arm 35 is fixed to and projects laterally from a bracket 44 mounted on slide rods 46. Rods 46 extend longitudinally from mounting plate 32. Consequently, as the motor 41 rotates the eccentric cam 38, the follower 35 is driven reciprocally between a retracted position, as shown in FIG. 4A, and a spaced or extended position, as shown in FIG. 4B, where plate 32 and bracket 44 are separated.

A cylinder 48 with a drive rod 50 is supported on a brake mounting plate 52 to which the brake 24 is attached. Rod 50 is fixed at one end to bracket 44. Operation of the cylinder 48 and, more particularly, movement of the rod 50 causes the plate 52 to move longitudinally and axially relative to the plate 44, in other words, in a direction parallel to axis 11 as depicted in FIG. 4C. Positioning the assembly with the brake 24 at the first station 26 (FIG. 4B) requires that the bracket 44 be moved longitudinally and axially forward from the fixed plate 32. This is effected by the operation of the motor 41, cam 38 and follower 35. The plate or bracket 44 is in the longitudinally extended position relative to the plate 32 by virtue of the movement thereof through the eccentrically mounted cam 38 and follower 35.

Subsequent movement of the brake 24 from the first station 26 to the second, or clipping, station 28 (FIG. 4C) is effected by actuation of the cylinder 48 and movement of rod 50. This separates plate 52 from plate or bracket 44.

Final movement of the brake 24 to the forward or product wiping position 30 (FIG. 4A) is effected by actuation of the cylinder 48 and rod 50 which moves the plate 52 against the plate 44. Additionally, the plate 44 is moved longitudinally and axially against the plate 32 by actuation of the eccentric cam 38. The brake 24 thus travels to the extreme forward position or third station 30 (FIG. 4A) thereby wiping the product 23 into the interior of the casing 16 as the brake moves over the end 14.

Subsequently, during the filling operation, the brake 24 is moved longitudinally rearward and over the expanded forward end 14 (FIG. 4B). This movement is effected by actuation of the eccentric cam 38. Thus, in the manner described, the brake 24 moves sequentially and step wise between the first station 26, second station 28 and third station 30, and thence again to the first station 26.

Other means for mounting the brake in order to effect the sequential operation and movement between the three stations to effect the wiping action of the brake 24 against the expanded forward end 14 of the horn 10 may be utilized. For example, a driving mechanism other than an eccentric cam 38 in a cam raceway 36 may be utilized. For example, a cylinder and rod arrangement may be utilized. Thus, while there has been set forth a preferred embodiment of the invention, it is to be understood that the invention is limited only by the following claims and equivalents thereof.

What is claimed is:

1. A casing brake construction for use with a product discharge horn to reduce product smear on casing comprising, in combination:

a generally cylindrical discharge horn having a longitudinal axis, a discharge end section with a diameter exceeding the diameter of the section immediately adjacent the discharge end section and also having a transition between the discharge end section and the adjacent section;

a casing brake including a resilient annular ring fitted over the discharge horn and a housing for the ring to maintain the ring generally concentric with the horn; and a casing brake mounting assembly including:

a first mounting plate generally aligned longitudinally forward of the discharge end section;

a second mounting plate attached to the first plate by a multiple position plate spacing first attachment mechanism having travel limits between a first brake forward position and a second brake rearward position;

and a third mounting plate for direct support of the brake, said third mounting plate further including a second attachment mechanism intermediate the second plate and the third plate for alternately spacing the second and third plates between a third brake forward position and a fourth brake rearward position, said attachment mechanisms capable of positioning the brake in a selected one of a casing release, fill and clip position, said clip position defined forward of the discharge end section, said fill position defined on the discharge end section and the casing release position defined on the adjacent section of the horn whereby movement of the brake is sequential from the fill to the rearward to the clip position and then returning to the fill position by movement of the mounting plates.

2. The combination of claim 1 wherein the first attachment mechanism includes a cam and follower associated respectively with the first and second mounting plates or vice versa.

3. The combination of claim 1 wherein the second attachment mechanism includes a rod and cylinder associated respectively with the second and third mounting plates or vice versa.

4. The combination of claim 1 wherein the first plate is fixed relative to the horn.

* * * * *